April 16, 1963   J. J. DI IENNO   3,085,774
ARTIFICIAL TREE
Filed Aug. 2, 1961   2 Sheets-Sheet 2
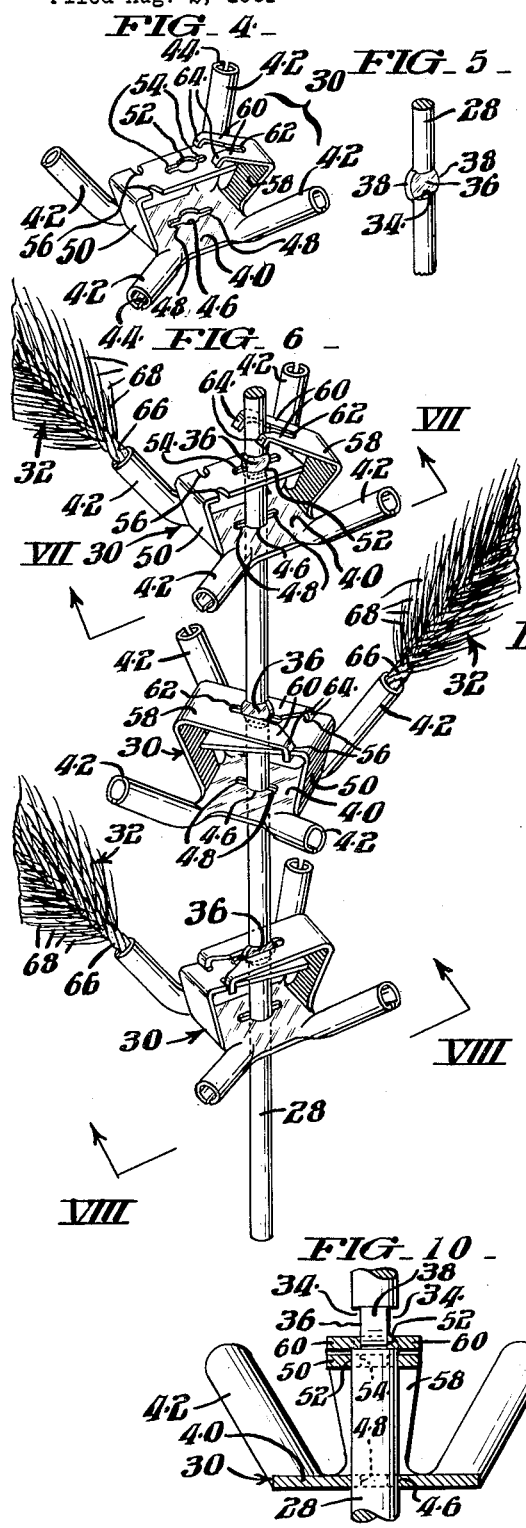
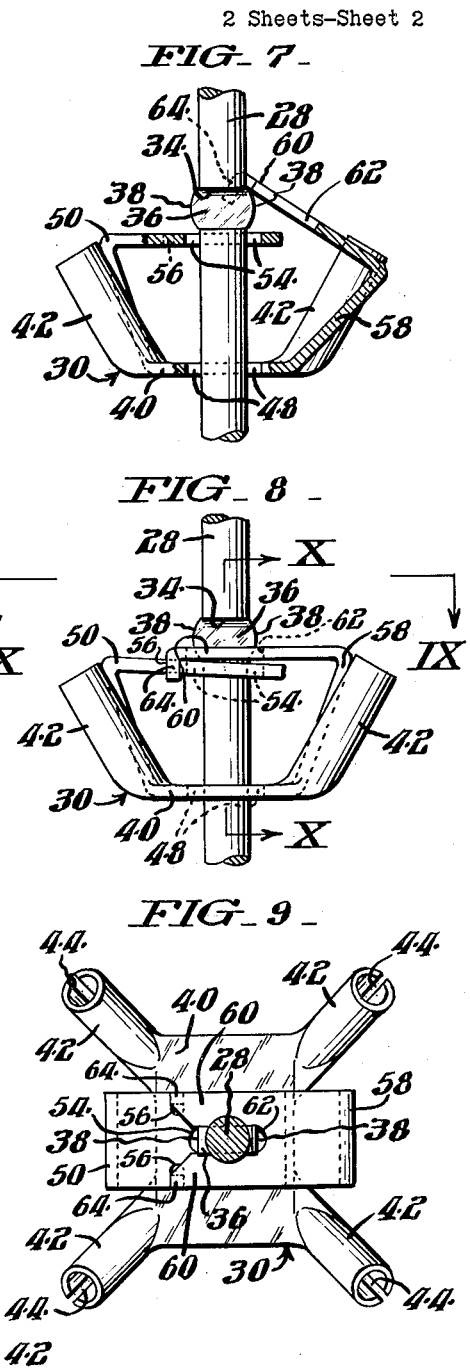
INVENTOR.
John J. DiIenno,
BY
Paul & Paul
ATTORNEYS.

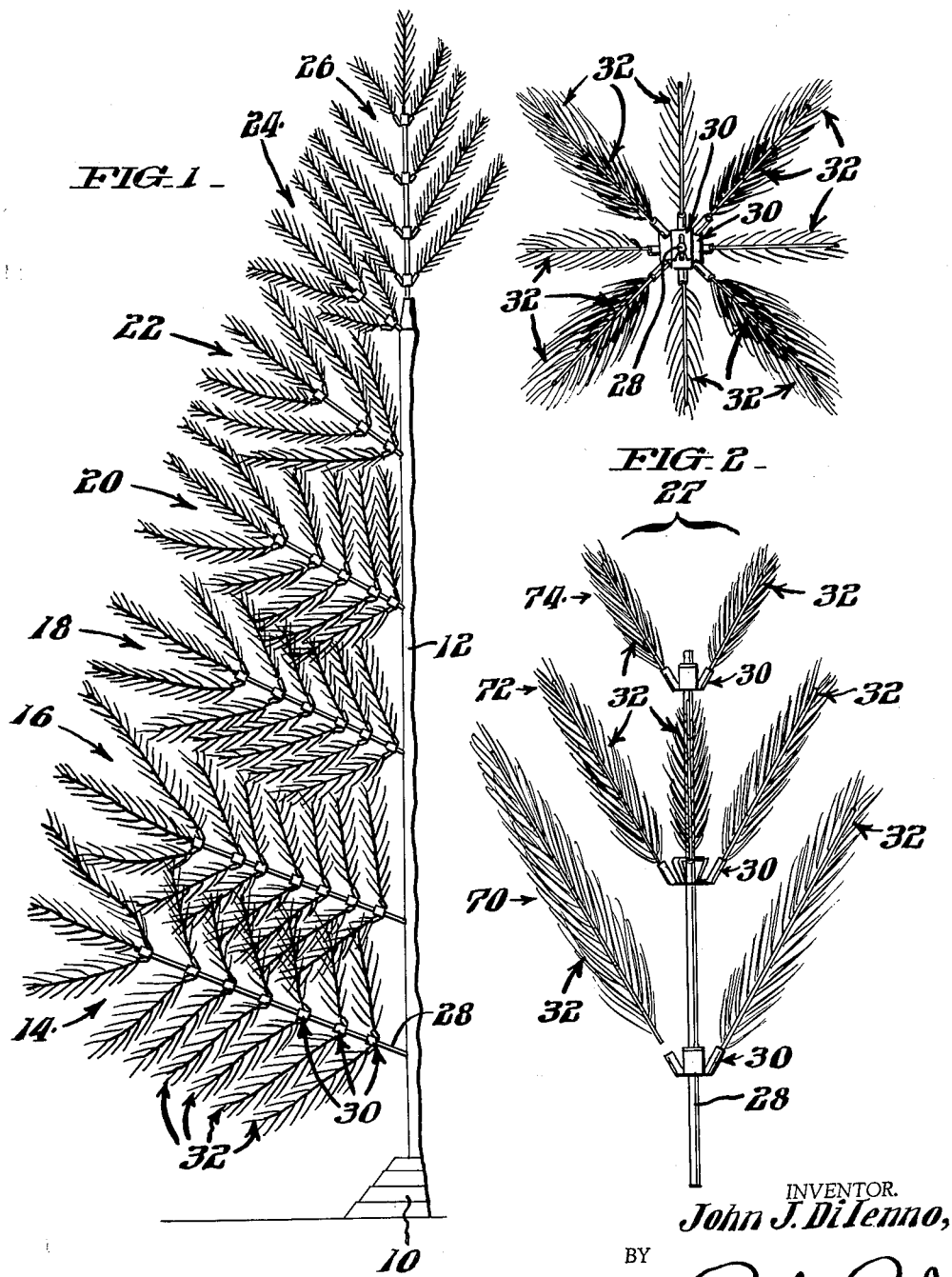

United States Patent Office 3,085,774
Patented Apr. 16, 1963

3,085,774
ARTIFICIAL TREE
John Joseph Di Ienno, Philadelphia, Pa., assignor to Carey-McFall Company, Philadelphia, Pa., a corporation of Pennsylvania
Filed Aug. 2, 1961, Ser. No. 128,783
6 Claims. (Cl. 248—39)

This invention relates generally to artificial trees and particularly to improved means for assembling the component parts thereof.

An object of the invention is to provide a knock-down construction for an artificial tree achieved by assembled parts capable of being produced by relatively high speed and low cost techniques.

Another object is to provide such a construction which enables the component parts of the branch to be readily assembled by anyone without necessitating the use of separate fastening devices or of tools of any kind.

Other objects of the invention will become apparent when the following description is read with reference to the accompanying drawings, in which:

FIG. 1 is a fragmentary elevation of an artificial tree embodying the invention;

FIG. 2 is an elevation of a limb or branch, showing one twig detached from its branch;

FIG. 3 is a view looking at the outer end of the typical branch;

FIG. 4 is a perspective view of a typical bracket used for mounting twigs on a branch, the bracket being shown alone, in its open condition, before being assembled with the other parts of the branch;

FIG. 5 is a perspective view of a section of the body of a branch;

FIG. 6 is a perspective view of a partially assembled branch section;

FIG. 7 is an enlarged fragmentary elevation, partly in section, as indicated by lines VII—VII in FIG. 6, showing the bracket fitted over the body of the branch and ready to be locked in position;

FIG. 8 is a fragmentary elevation, as indicated by lines VIII—VIII in FIG. 6, showing the bracket fitted over the body of the branch and locked in position;

FIG. 9 is a section on line IX—IX of FIG. 8; and

FIG. 10 is a section on line X—X in FIG. 8.

Referring particularly to FIG. 1, an artificial tree constructed in accordance with the invention comprises a supporting base 10, an upright trunk 12, and tiers of branches, generally designated 14, 16, 18, 20, 22, 24, and 26. Each tier, excepting the topmost tier 26, comprises a cluster of three branches fanning out from the trunk 12 in angularly spaced relation. Orientation of the branches of the several tiers about the trunk 12 is such that no branch is directly below a branch of the next highest tier. The tier 26 consists of a single branch extending upwardly in longitudinal continuation of the trunk 12. The tree is conical in configuration, with the apex thereof at the top. The conical surface of the tree, as developed by the branches, is regular and uniform. The branches are angularly disposed upwardly relative to the trunk 12 at the same acute angle. The foliage of the tree, as contributed by the branches, is uniformly full and dense along the length of the trunk, giving the tree a luxuriant, decorative, and distinctive appearance.

Referring particularly to FIG. 2, a typical branch, generally designated 27, comprises a branch body in the form of a rod 28, upon which is mounted, for example, three brackets, generally designated 30. Each bracket carries a cluster of four twigs 32.

Axially spaced portions of the rod 28 are provided with cross axially extending notches 34 on diametrically opposite sides of the rod thereby to provide the rod with a flat bar portion 36. The notches are formed by flattening the bar, in consequence of which the bar is upset on diametrically opposite sides thereof, as at 38.

The brackets 30 are stamped from sheet metal, and each is provided with a generally rectangular central panel 40 from each corner of which extends a part which is turned out of the plane of the panel and formed into a sleeve 42 which is longitudinally split, as at 44. In the center of the panel 40 is an opening 46 having radially outwardly extending portions 48 on opposite sides thereof. From one side of the panel 40, between two of the sleeves 42, extends an arm 50 in which is an opening 52 having radially outwardly extending portions 54 on opposite sides thereof. On opposite sides of the arm 50 respectively are a pair of notches 56. On the opposite side of the panel 40, between the other two sleeves 42, is an arm 58 terminating in a bifurcated portion, the furcations 60 of which are separated by a recess 62. Each furcation is provided with a hook 64.

The twigs 32 are each formed of intertwisted lengths of wire 66 between which are worked short threads or tinsels made of suitable material, designated 68.

In assembling a branch of the artificial tree, a bracket 30, in its initial open condition (FIG. 4), is fitted over one end of the rod 28. The openings 46 and 52 receive the round body of the rod, and the radially outwardly extending portions 48 and 54 respectively of the openings 46 and 52 accommodate the upset portions 38 of the rod. After passing a flat bar portion 36, the bracket 30 is turned about the rod to align the portions 48 and 54 respectively of the openings 46 and 52 with the next flat bar portion 36.

The bracket is positioned on rod 28 with arm 50 proximate the desired flat bar portion 36. Then arm 58 is bent downwardly by finger pressure so that the furcations 60 straddle the flat bar portion 36, and hooks 64 snap into notches 56. Thus, the bracket is releasably locked against movement axially of the rod and secured against movement about the axis of the rod. When all of the brackets have been mounted upon the rod 28, the ends of the twigs 32 are inserted into the sleeves 42 to form clusters of four twigs, which, in FIG. 2, are generally designated 70, 72, and 74. Now the end of each rod 28 is inserted into a socket formed in the trunk 12 of the tree.

It will be understood that the present invention, as shown and described, is susceptible to various changes and modifications which may be made without any departure from the general principles or real spirit of the invention. Accordingly, it is intended to claim the invention broadly, as well as specifically, as indicated in the appended claims.

Having thus described my invention, I claim as follows:

1. In a limb for an artificial tree, the combination comprising a rod, and a plurality of axially spaced brackets mounted upon said rod each consisting of a body stamped out of sheet metal and provided with a central panel having said rod extending freely therethrough, a plurality of sleeves diverging from said panel and turned in the same direction out of the plane thereof, and a pair of arms extending respectively from opposite sides of said panel and terminating in mutually overlying interlocked portions one of which is bifurcated for embracing and interlocking with said rod for operatively securing said bracket against movement relative to said rod.

2. In a limb for an artificial tree, the combination comprising a rod, and a plurality of axially spaced brackets mounted upon said rod each consisting of a body stamped out of sheet metal and provided with a central panel having said rod extending freely therethrough, a plurality of sleeves diverging from said panel and turned in the same direction out of the plane thereof, and a pair of arms extending respectively from opposite sides of said panel and terminating in mutually overlying portions one of which is bifurcated for embracing and interlocking with said rod for operatively securing said bracket against movement relative to said rod, said furcations being provided with hooked ends engaging in notches in the other of said mutually overlying arm portions.

3. In a limb for an artificial tree, the combination comprising a rod having axially spaced non-circular portions intermediate the ends thereof, and a plurality of axially spaced brackets mounted upon said rod each consisting of a body stamped out of sheet metal and provided with a central panel having said rod extending freely therethrough, a plurality of sleeves diverging from said panel and turned in the same direction out of the plane thereof, and a pair of arms extending respectively from opposite sides of said panel and terminating in mutually overlying portions, one of said arm portions having said rod extending freely therethrough and the other being bifurcated for embracing one of said non-circular rod portions to interlock with said rod for operatively securing said bracket against movement relative to said rod, said furcations being provided with hooked ends engaging in notches in the other of said mutually overlying arm portions.

4. In a limb for an artificial tree, the combination comprising a round rod having axially spaced flattened portions intermediate the ends thereof, said flattened portions extending cross axially of said rod in angularly spaced relation to each other, and a plurality of axially spaced brackets mounted upon said rod each consisting of a body stamped out of sheet metal and provided with a central panel having said rod extending freely therethrough, a plurality of sleeves diverging from said panel and turned in the same direction out of the plane thereof, and a pair of arms extending respectively from opposite sides of said panel and terminating in mutually overlying portions, one of said arm portions having said rod extending freely therethrough and the other being bifurcated for embracing one of said flattened rod portions to interlock with said rod for operatively securing said bracket against movement relative to said rod, said furcations being provided with hooked ends engaging in notches in the other of said mutually overlying arm portions.

5. In a limb for an artificial tree, the combination comprising a rod having axially spaced non-circular portions intermediate the ends thereof, said non-circular portions extending cross axially of said rod and being disposed in planes angularly oriented with respect to each other, and a plurality of axially spaced brackets mounted upon said rod each consisting of a body stamped out of sheet material and provided with a central panel having said rod extending freely therethrough, a plurality of sleeves extending outwardly and upwardly from said panel whereby the twigs will fan out as in a natural tree and no twig will be directly below one immediately above, and a pair of arms extending from said panel and interlocked with one of said non-circular rod portions for operatively securing said bracket against movement relative to said rod.

6. In a limb for an artificial tree, the combination comprising a round rod having axially spaced flattened portions intermediate the ends thereof, said flattened portions extending cross axially of said rod and being disposed in planes angularly oriented with respect to each other, and a plurality of axially spaced brackets mounted upon said rod each consisting of a body stamped out of sheet material and provided with a central panel having said rod extending freely therethrough, a plurality of sleeves extending outwardly and upwardly from said panel whereby the twigs will fan out as in a natural tree and no twig will be directly below one immediately above, and a pair of arms extending from said panel and interlocked with one of said flattened rod portions for operatively securing said bracket against movement relative to said rod.

References Cited in the file of this patent

UNITED STATES PATENTS

| 1,895,609 | Davis | Jan. 31, 1933 |
| 2,826,845 | Warren | Mar. 18, 1958 |

FOREIGN PATENTS

| 50,011 | Denmark | Mar. 5, 1935 |